Figure 1:
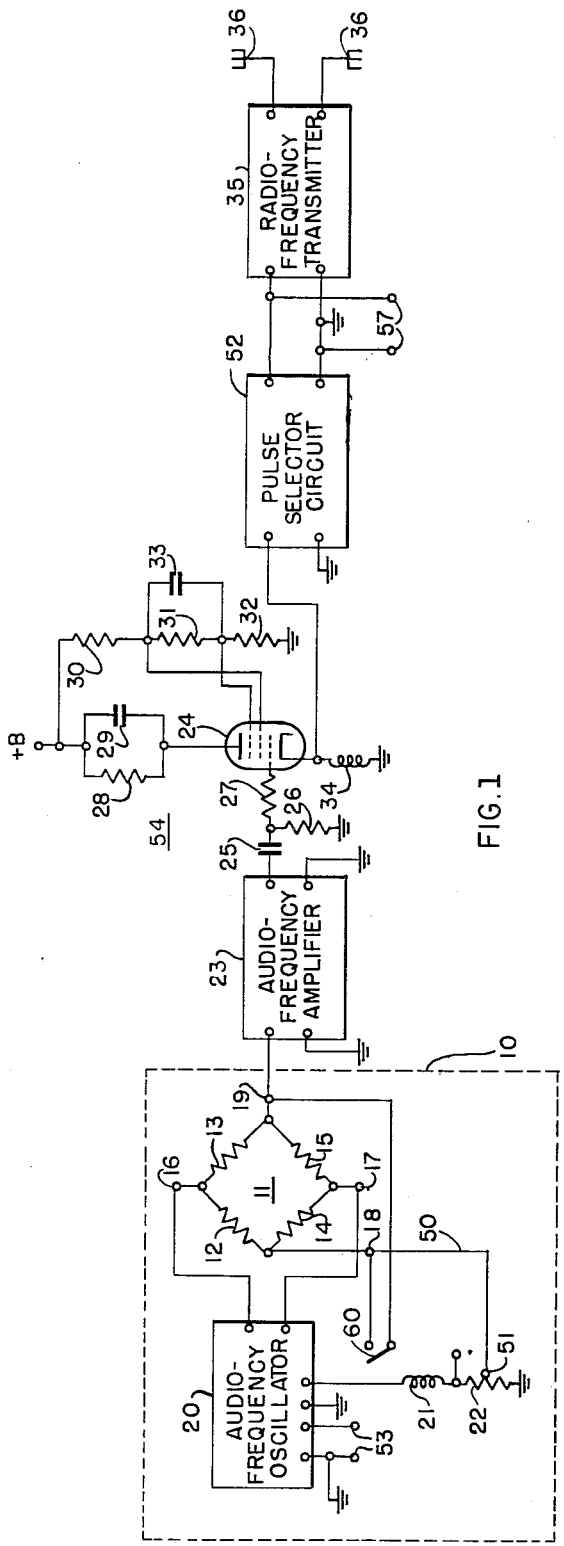

July 24, 1956

R. E. TURNAGE, JR 2,756,411

SYSTEM FOR DERIVING A SIGNAL REPRESENTATIVE
OF IMPEDANCE VARIATIONS

Filed Jan. 12, 1952

2 Sheets-Sheet 1

*INVENTOR.*
RODGER E. TURNAGE, Jr.

BY *Laurence B. Dodds*

ATTORNEY

July 24, 1956  R. E. TURNAGE, JR  2,756,411
SYSTEM FOR DERIVING A SIGNAL REPRESENTATIVE
OF IMPEDANCE VARIATIONS
Filed Jan. 12, 1952  2 Sheets-Sheet 2

INVENTOR.
RODGER E. TURNAGE, Jr.
BY *Laurence B. Dodds*
ATTORNEY

United States Patent Office

2,756,411
Patented July 24, 1956

2,756,411

SYSTEM FOR DERIVING A SIGNAL REPRESENTATIVE OF IMPEDANCE VARIATIONS

Rodger E. Turnage, Jr., Babylon, N. Y., assignor to Hazeltine Research, Inc., Chicago, Ill., a corporation of Illinois Application January 12, 1952, Serial No. 266,149

8 Claims. (Cl. 340—208)

General

The present invention relates to systems for deriving signals representative of impedance variations and, more particularly, to such systems of the type which derives a signal having a phase representative of impedance variations. Such a system has particular utility as a strain-gauge circuit employed in conjunction with telemetering equipment and, hence, will be described in that environment.

A strain-gauge circuit heretofore proposed for measuring the deformation of an object, such as a member of an aircraft or guided missile in flight, has utilized fine-wire variable resistors connected in a bridge circuit and having an inductor coupled in a parallel relation with one of the resistors. The resistors were so attached to the aircraft member undergoing deformation that the deformation of the member caused variations in the dimensions of the resistors which effected impedance variations thereof. These impedance variations resulted in phase variations of the bridge output signal which were representative of the deformations of the aircraft member and were utilized to control the operation of a telemetering transmitter.

The heretofore proposed circuit had the disadvantage that, in order to change the bridge sensitivity or the values of the bridge resistors, it was necessary to utilize an accurately tapped inductor or additional inductors, thereby adding to the cost and complexity of the circuit. Further, when the aircraft was in flight, calibration of the telemetering equipment by transmitting a signal representative of zero deformation of the aircraft member required the use of an additional or "dummy" bridge.

It is an object of the present invention, therefore, to provide a new and improved system for deriving a signal representative of the impedance variations which avoids one or more of the above-mentioned disadvantages and limitations of the system heretofore proposed.

It is another object of the invention to provide a new and improved system for deriving a signal having a phase representative of impedance variations which has a readily controllable sensitivity.

It is still another object of the invention to provide a new and improved system for deriving a signal having a phase representative of impedance variations which is adaptable for use as a strain-gauge circuit utilized in telemetering equipment and which may be utilized to calibrate the equipment.

In accordance with a particular form of the invention, a system for deriving a signal having a phase representative of impedance variations comprises a normally balanced impedance network including a variable impedance element and subject to being unbalanced by variations thereof and includes a circuit for supplying a first periodic signal of predetermined repetition frequency to the network. The network has terminals at which is developed a signal representative of an unbalance of the network. The system also includes a circuit for supplying a second periodic signal of the aforesaid predetermined repetition frequency and having a sinusoidal component in synchronism with and phase displaced from a sinusoidal component of the developed signal and a circuit for combining the aforesaid sinusoidal components to derive therefrom a resultant signal having a phase which is representative of the impedance variations of the above-mentioned element.

For a better understanding of the present invention, together with other and further objects thereof, reference is had to the following description taken in connection with the accompanying drawings, and its scope will be pointed out in the appended claims.

Figure 3:
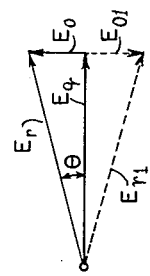
Figure 4:
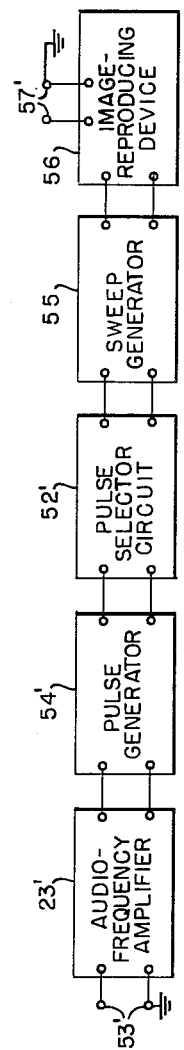
Figure 2:
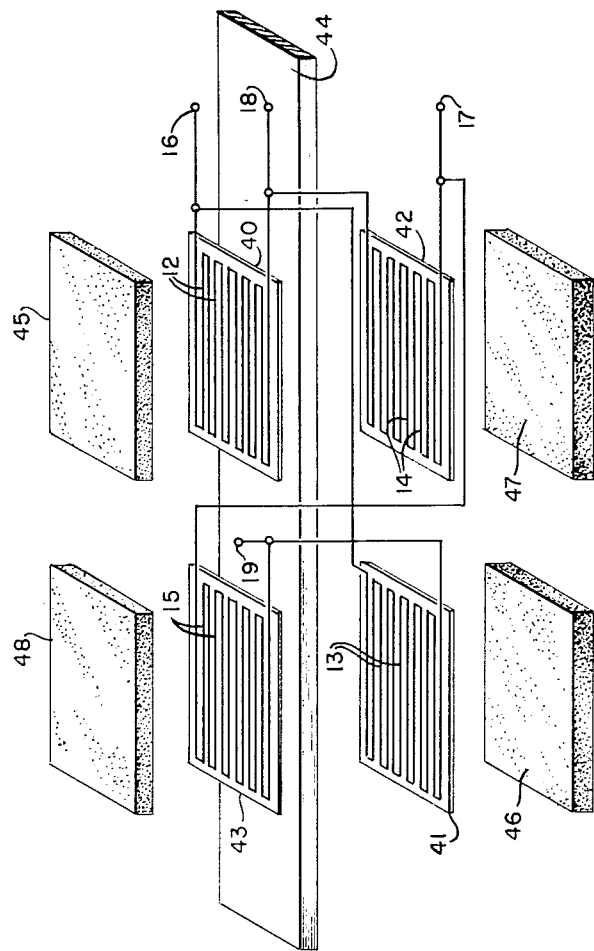

In the accompanying drawings, Fig. 1 is a diagram representing telemetering equipment including a system for deriving a signal representative of impedance variations constructed in accordance with a particular form of the invention; Fig. 2 represents a portion of the signal-deriving system; Fig. 3 is a vector diagram to aid in explaining the operation of the signal-deriving system; and Fig. 4 represents a monitor for use in conjunction with the Fig. 1 equipment.

Description of Fig. 1 equipment

Referring now more particularly to Fig. 1 of the drawings, there is represented telemetering equipment which may be mounted on an aircraft and which includes a system 10 for deriving a signal having a phase representative of impedance variations and constructed in accordance with the invention. The system 10 comprises a normally balanced impedance network, specifically, an impedance bridge 11 including a variable impedance element. More particularly, the impedance network 11 includes four variable resistors 12, 13, 14 and 15 and is subject to being unbalanced by variations thereof. It will be understood that by variable impedance element is meant an element having an impedance which may vary in accordance with adjustment thereof, changes in the dimensions of the element, or otherwise. When the impedance network 11 is in a balanced condition the resistors 12–15, inclusive, ordinarily have the same resistance values, but the term "normally balanced" is also meant to describe a network having arms of normally unequal resistance values. In such a case, an unbalance of the network is a change of balance of the network from its "normally balanced" condition. The network also has a pair of input terminals 16, 17 and a pair of output terminals 18, 19 at which is developed a signal representative of an unbalance of the network. A normally open switch 60 is connected across the terminals 18, 19 for use in calibrating the equipment as will be explained hereinafter.

The construction of the impedance network 11 may more readily be described by referring to Fig. 2 of the drawings, which is an exploded view of the elements included in the network 11, elements corresponding to those of Fig. 1 having the same reference numerals as the Fig. 1 elements. The resistors 12–15, inclusive, ordinarily are similarly constructed and preferably comprise fine high-resistance wires, such as copper-nickel wires, having several turns thereof mounted on thin sheets of paper 40–53, respectively, as represented in Fig. 2. The sheets 40, 43 and the sheets 41, 42 preferably are attached to opposite sides of an aircraft member 44, such as a portion of a wing which is subject to deformation. The resistors 12–15, inclusive, preferably have variable dimensions which control the impedance thereof and which vary in accordance with deformations of the member 44. These resistors may be protected during flight by suitable pieces of felt, 45–48, respectively, for covering the resistors.

Referring again to Fig. 1, the remainder of the system 10 including the switch 60 ordinarily is located within the aircraft. The system 10 also includes a circuit for supplying a first periodic signal to the network 11. The supply circuit preferably comprises a periodic-signal generator for supplying a periodic signal having a substantial sinusoidal component, such as a sinusoidal signal generator or audio-frequency oscillator 20 having an output circuit coupled to the input terminals 16, 17 for supplying a first sinusoidal signal of substantially constant amplitude to the network 11. The system also includes a circuit for supplying a second periodic signal having a sinusoidal component in synchronism with and phase displaced from a sinusoidal component of the signal developed at the output terminals 18, 19. This circuit preferably comprises a phase-shifting network responsive to the first periodic signal developed in the output circuit of the audio-frequency oscillator 20 for supplying a second sinusoidal signal of substantially constant amplitude in phase quadrature with the signal developed at the network output terminals 18, 19. More particularly, an inductor 21 and a tapped resistor 22 of suitable values are coupled in a series relation across an ouput circuit of the audio-frequency oscillator 20. The circuits for supplying the first and second signals preferably are so proportioned that the amplitudes of the first and second signals are maintained in the same ratio despite any amplitude variations thereof.

The signal-deriving system 10 further includes a circuit for combining the phase-displaced components of the second periodic signal supplied by the phase-shifting network 21, 22 and the signal developed at the output terminals 18, 19 of the network 11 to derive therefrom a resultant signal having a phase which is representative of the impedance variations of the variable resistors 12–15. Specifically, the combining circuit comprises a conductor 50 connected to a tap 51 on the resistor 22 for coupling the network terminals 18, 19 and the phase-shifting network 21, 22 in a series relation for vectorially combining the developed signal and the second periodic signal.

The output circuit of the system 10 is coupled to the control electrode-cathode circuit of a tube 24 of a pulse generator 54 through an audio-frequency amplifier 23 of conventional construction, a coupling condenser 25, a grid-leak resistor 26, and a grid current-limiting resistor 27. The anode of the tube 24 is coupled to a suitable source of positive potential +B through an anode-load resistor 28 having a parallel-connected high-frequency by-pass condenser 29. The screen and suppressor electrodes of the tube 24 are connected to a voltage divider comprising resistors 30, 31 and 32 connected in series relation across the source +B for providing suitable operating potentials for the screen and suppressor electrodes to cause the tube 24 to have a negative suppressor-screen transconductance during a portion of the operating cycle of the pulse generator 54. A condenser 33 is connected in parallel with the resistor 31 to form with that resistor a coupling network between the suppressor and screen electrodes. A pulse-forming inductor 34 is coupled to the cathode of the tube 24 and to a suitable pulse selector circuit 52 which may comprise, for example, a biased diode circuit for developing output pulses in response only to pulses having a predetermined polarity and having amplitudes greater than a predetermined level. The output circuit of the pulse selector circuit 52 is coupled to a suitable modulating input circuit of a conventional radio-frequency transmitter 35 having its output circuit coupled to an antenna 36.

*Operation of Fig. 1 equipment*

Considering now the operation of the Fig. 1 telemetering equipment, assume for the moment that the impedance network 11 is attached to an aircraft member, such as the member 44 represented in Fig. 2, which will undergo deformation in flight, for example, bending. When the member 44 is as shown, that is, not deformed, the network 11 is balanced and the resistors 12–15 may have the same dimensions and the same impedance. Accordingly, under such operating conditions when the audio-frequency oscillator 20 of the Fig. 1 embodiment applies a sinusoidal signal to the input terminals 16, 17 of the network 11, no output signal is developed by the network 11 at the terminals 18, 19 in response thereto. The audio-frequency oscillator 20 also applies to the phase-shifting network 21, 22 a sinusoidal signal having the same phase as the signal applied by the oscillator 20 to the network terminals 16, 17. Accordingly, there is developed across the resistor 22 a sinusoidal signal having a quadrature-phase relation to the signal applied to the terminals 16, 17. Since no output signal is developed across the network output terminals 18, 19, the quadrature-phase signal developed at the tap 51 of the resistor 22 is applied to the input circuit of the audio-frequency amplifier 23 wherein it is amplified and applied to the control electrode-cathode circuit of the pulse generator tube 24.

During a major portion of the negative half cycle of the sinusoidal signal applied to the control electrode-cathode circuit of the tube 24, that tube is maintained by the applied signal in a condition of space-current cutoff. During the negative half cycle, slightly before the commencement of the positive half cycle, as the control-electrode potential rises above the cutoff level of the tube 24, a relatively slowly increasing space current commences to flow therein. Screen-electrode current flow and anode-current flow in the tube 24 then cause the screen-electrode and anode potentials thereof to fall. The decrease in screen-electrode potential is applied to the suppressor electrode through the resistor-condenser network 31, 33 causing the suppressor electrode to become less positive. Due to the diversion of current flow by the suppressor electrode from the anode to the screen electrode, the decrease in the suppressor-electrode potential causes the reduction of anode-current flow to zero and causes a further increase in the screen-electrode current flow. Under the control of the control-electrode signal, space-current flow continues to increase until control-electrode current flows during the positive half cycle of the signal applied to the control electrode-cathode circuit of the tube 24. During the period of the increasing space-current flow a positive potential pulse of relatively small amplitude is developed across the inductor 34. The space-current flow then remains substantially constant for a major portion of the positive cycle of the applied signal.

Slightly before the commencement of the negative half cycle of the signal applied to the control electrode-cathode circuit of the tube 24, the screen-electrode current flow decreases because of the falling control-electrode potential and, hence, the screen-electrode potential rises. This rise in screen-electrode potential is applied to the suppressor electrode through the resistor-condenser network 31, 33 causing the suppressor-electrode potential rapidly to rise. Because of the diversion of current flow by the suppressor electrode from the screen electrode to the anode, the screen-electrode potential rise is accelerated causing a rapid increase in the space-current flow through the tube 24 which develops a positive potential pulse of relatively large amplitude across the inductor 34. Shortly thereafter the signal applied to the control electrode of the tube 24 drives the tube to space-current cutoff and a negative potential pulse is developed across the inductor 34.

The pulses developed across the inductor 34 are applied to the pulse selector circuit 52 which is proportioned to respond only to the positive potential pulse of relatively large amplitude. The output pulse derived by the circuit 52 is then applied to the radio-frequency transmitter 35 wherein its pulse modulates the output signal of the transmitter. It will be understood that a positive potential pulse of relatively large amplitude is developed across the inductor 34 whenever the output signal of the amplifier 23 changes from a positive to a negative value and, hence, the times of occurrence of such pulses and the output pulses of the pulse selector circuit 52 are representative of the phase of the output signal of the unit 23.

Assume now that the aircraft is in flight and that the member 44 represented in Fig. 2 is subject to a force causing a maximum bending thereof which results in a maximum surface stress of, for example, 20,000 pounds per square inch and which in turn causes the lengths of the resistors 13 and 14 to increase and the lengths of the resistors 12 and 15 to decrease. Accordingly, the resistance values of the resistors 13 and 14 increase and the resistance values of the resistors 12 and 15 decrease because of the altered dimensions thereof. The network 11 then develops at the output terminals 18, 19 a signal which is representative of the unbalance of the network and thus of the force causing the unbalance. Under such operating conditions there is developed across the resistor 22 of the phase-shifting network 21, 22 a signal in phase quadrature with the signal developed at the terminals 18, 19 and having a large amplitude relative thereto. The phase relation of these signals may be seen by referring to Fig. 3 which is a vector diagram where $E_o$ represents vectorially the signal developed at the network output terminals 18, 19 under the operating conditions just assumed and $E_q$ represents the signal developed at the tap 51 of the resistor 22. The vector sum of these signals has approximately the same amplitude as the quadrature-phase signal $E_q$ and is represented by a resultant vector $E_r$ which is phase displaced from the signal $E_q$ by an angle $\theta$ determined by the amplitude of the signal $E_o$ developed at the terminals 18, 19. The resultant signal $E_r$ is applied by the network 11 and the phase-shifting network 21, 22 to the input circuit of the audio-frequency amplifier 23 which amplifies and applies that signal to the controle electrode-cathode circuit of the pulse generator tube 24.

As the bending of the member 44 of Fig. 2 varies, the phase of the resultant signal $E_r$ varies accordingly. For example, maximum bending of the member 44 in the sense opposite to that just assumed causes a shortening of the resistors 13 and 14 and a lengthening of the resistors 12 and 15. Corresponding changes result in the resistance values of the resistors to develop at the terminals 18, 19 of the impedance network 11 an output signal of opposite polarity to the signal $E_o$, as represented by the broken-line vector $E_{o1}$ of Fig. 3. The resultant signal then developed from the signal at the tap 51 of the resistor 22 and from the signal at the terminals 18, 19 is represented in broken-line construction by the vector $E_{r1}$. This signal has the same amplitude as the signal $E_r$ but has a phase displacement of the opposite sense from the signal $E_r$.

From the foregoing explanation it will be seen that the phase of the resultant signal developed by the phase-shifting network 21, 22 and the network 11 is representative of the impedance variations of the resistors of the network 11 and, hence, of the force causing deformation of the member 44 represented in Fig. 2. Accordingly, the times of occurrence to the positive output pulses of relatively large amplitude of the pluse generator 54 developed in response to the signal applied thereto by the audio-frequency amplifier 23 are representative of the impedance variations of the network 11 and of the force causing the deformation of the member 44. The times of occurrence of these pulses may be indicated in any suitable manner, such as by the monitor of Fig. 4 to be described subsequently.

To calibrate the telemetering equipment while the aircraft is in flight, it is necessary simply to short-circuit the output terminals 18, 19 of the network 11 by closing the switch 60, thereby applying the quadrature-phase signal developed at the tap 51 of the resistor 22 directly to the input circuit of the audio-frequency amplifier 23. Accordingly, the positive pulses of large amplitude then derived by the pulse generator 54 are representative of zero force or zero deformation of the member 44.

To change the sensitivity of the impedance network 11, that is, to change the ratio of the maximum amplitude of the signal developed at the terminals 18, 19 to the amplitude of the quadrature-phase signal additively combined therewith, the amplitude of the quadrature-phase signal may be changed by connecting the circuit conductor 50 to another tap of the resistor 22.

The resistance values of the resistors 12–15, inclusive, may ordinarily be changed without requiring further circuit changes.

While applicant does not wish to be limited to any particular circuit values, the following circuit constants and parameters have been employed in a system constructed in accordance with the unit 10 of Fig. 1:

| | |
|---|---|
| Frequency of audio-frequency oscillator 20 | 1390 cycles/second. |
| Type of resistors 12–15 | Copper-nickel wire. |
| Normal length of each ½ turn of re-resistors 12–15 | 1.0 inch. |
| Maximum deformation of each ½ turn of resistors 12–15 | .000625 inch. |
| Number of turns of each of resistors 12–15 | 6–8. |
| Resistors 12, 13, 14 and 15, mean value | 300 ohms. |
| Resistor 22 | 600 ohms. |
| Resistance between the tap 51 and ground | 75 ohms. |
| Inductor 21 | 136 millihenries. |
| Amplitude of signal at terminals 16, 17 | 5.0 volts (R. M. S.). |
| Amplitude of quadrature-phase signal ($E_q$) at the tap 51 | .0395 volt. |
| Maximum amplitude of network 11 output signal ($E_o$) | .00625 volt. |

Description of Fig. 4 monitor

Referring now more particularly to Fig. 4 of the drawings, there is represented a monitor for use in conjunction with the Fig. 1 equipment, elements of the monitor which may be similar in construction to corresponding elements of the Fig. 1 equipment being designated by similar reference numerals primed. The monitor comprises a conventional audio-frequency amplifier 23' having a pair of input terminals 53', 53' for connection to a pair of output terminals 53, 53 of the Fig. 1 audio-frequency oscillator 20. The output circuit of the audio-frequency amplifier 23' is coupled to the input circuit of a pulse generator 54' which is coupled through a pulse selector circuit 52' to a suitable synchronized or triggered sweep generator 55 for developing periodic saw-tooth signals individually initiated at the occurrence of each output pulse from the pulse selector circuit 52'. The sweep generator 55 is coupled to one deflection circuit of an image-reproducing device 56 of conventional construction which may comprise a cathode-ray tube and which has another deflection circuit having a pair of input terminals 57', 57' for connection to a pair of output terminals 57, 57 of the pulse selector circuit 52 of the Fig. 1 equipment.

Operation of Fig. 4 monitor

When the Fig. 4 monitor is operatively connected to the Fig. 1 equipment by connecting together corresponding terminals, an output signal of the Fig. 1 audio-frequency oscillator 20 having a predetermined phase relation to the signal applied by that oscillator to the impedance network 11 is applied to the input terminals 53', 53' of the audio-frequency amplifier 23' wherein it is amplified and applied to the input circuit of the pulse generator 54'. The pulse generator 54' responds to this signal in the same manner as the pulse generator 54 responds to the output signal of the audio-frequency amplifier 23 of the Fig. 1 equipment and develops output pulses which are applied to the pulse selector circuit 52'.

The pulse selector circuit 52' supplies a trigger pulse to the sweep generator 55 in response to each pulse developed by the pulse generator 54' having a predetermined polarity and having an amplitude above a predetermined level. Thus, the sweep generator 55 is triggered once during each cycle of the output signal of the audio-frequency oscillator 20 of the Fig. 1 equipment by a reference pulse which establishes a predetermined phase reference for the resultant signal derived from the impedance network 11 and the phase-shifting network 21, 22 and applied to the audio-frequency amplifier 23. The sweep signal applied by the sweep generator 55 to the image-reproducing device 56 causes the periodic deflection of the cathode-ray beam of that device in one direction on the display screen thereof. The pulses derived by the pulse selector circuit 52 of the Fig. 1 equipment and applied to the terminals 57', 57' of the other deflection circuit of the image-reproducing device 56 cause the periodic deflection of the cathode-ray beam of the device 56 in another direction on the display screen, thereby periodically to reproduce the output pulses of the pulse selector circuit 52 on the display screen of the device 56. Because the phase of the resultant signal derived from the impedance network 11 and the phase-shifting network 21, 22, relative to the phase of the signal developed at the terminals 53, 53 of the audio-frequency oscillator 20 of the Fig. 1 equipment, varies in accordance with the impedance variations of the resistors of the network 11, the times of occurrence of the output pulses of the pulse selector circuit 52 relative to the reference pulses derived by the pulse selector circuit 52' are representative of the impedance variations. These impedance variations, of course, may be read from the image-reproducing device display screen by the use of a suitable scale.

From the foregoing description, it will be apparent that a system for deriving a signal having a phase representative of impedance variations constructed in accordance with the invention and utilized in conjunction with telemetering equipment has the advantage that the equipment may readily be calibrated and that the sensitivity of the system may readily be controlled.

While there has been described what is at present considered to be the preferred embodiment of this invention, it will be obvious to those skilled in the art that various changes and modifications may be made therein without departing from the invention, and it is, therefore, aimed to cover all such changes and modifications as fall within the true spirit and scope of the invention.

What is claimed is:

1. A system for deriving a signal having a phase representative of resistance variations comprising: a normally balanced resistance bridge including two pairs of oppositely variable resistors and subject to being unbalanced by resistance variations thereof; a sinusoidal-signal generator for supplying a first sinusoidal signal of predetermined repetition frequency to said bridge; said bridge having terminals at which is developed a sinusoidal signal of said predetermined repetition frequency and representative of an unbalance of said bridge; a phase-shifting network responsive to said first sinusoidal signal for supplying a second sinusoidal signal of said predetermined repetition frequency in phase quadrature with said developed signal; and a circuit for coupling said bridge terminals and said phase-shifting network in a series relation for vectorially combining said developed signal and said second signal to derive therefrom a resultant signal having a phase which is representative of said resistance variations.

2. A system for deriving a signal having a phase representative of impedance variations comprising: a normally balanced impedance network including a variable impedance element and subject to being unbalanced by variations thereof; a circuit for supplying a first periodic signal of predetermined repetition frequency to said network; said network having terminals at which is developed a signal representative of an unbalance of said network; a circuit for supplying a second periodic signal of said predetermined repetition frequency and having a sinusoidal component in synchronism with and phase displaced from a sinusoidal component of said developed signal; and a circuit for combining said sinusoidal components to derive therefrom a resultant signal having a phase which is representative of said impedance variations of said element.

3. A system for deriving a signal having a phase representative of resistance variations comprising: a normally balanced resistance network including a variable resistor and subject to being unbalanced by variations thereof; a circuit for supplying a first periodic signal of predetermined repetition frequency to said network; said network having terminals at which is developed a signal representative of an unbalance of said network; a circuit for supplying a second periodic signal of said predetermined repetition frequency and having a sinusoidal component in synchronism with and phase displaced from a sinusoidal component of said developed signal; and a circuit for combining said sinusoidal components to derive therefrom a resultant signal having a phase which is representative of said resistance variations.

4. A system for deriving a signal having a phase representative of impedance variations comprising: a normally balanced impedance bridge including two pairs of oppositely variable impedance elements and subject to being unbalanced by variations thereof; a circuit for supplying a first periodic signal of predetermined repetition frequency to said bridge; said bridge having terminals at which is developed a signal representative of an unbalance of said bridge; a circuit for supplying a second periodic signal of said predetermined repetition frequency and having a sinusoidal component in synchronism with and phase displaced from a sinusoidal component of said developed signal; and a circuit for combining said sinusoidal components to derive therefrom a resultant signal having a phase which is representative of said impedance variations of said elements.

5. A system for deriving a signal having a phase representative of impedance variations comprising: a normally balanced impedance network including a variable impedance element and subject to being unbalanced by variations thereof; a sinusoidal-signal generator for supplying a first sinusoidal signal of predetermined repetition frequency to said network; said network having terminals at which is developed a sinusoidal signal of said predetermined repetition frequency and representative of an unbalance of said network; a circuit for supplying a second sinusoidal signal of said predetermined repetition frequency phase displaced from said developed signal; and a circuit for combining said developed signal and said second signal to derive therefrom a resultant signal of said predetermined repetition frequency and having a phase which is representative of said impedance variations of said element.

6. A system for deriving a signal having a phase representative of impedance variations comprising; a normally balanced impedance network including a variable impedance element and subject to being unbalanced by variations thereof; a circuit for supplying a first periodic signal of predetermined repetition frequency to said network; said network having terminals at which is developed a signal representative of an unbalance of said network; a phase-shifting network responsive to said first periodic signal for supplying a second periodic signal of said predetermined repetition frequency and having a sinusoidal component in synchronism with and in phase quadrature with a sinusoidal component of said developed signal; and a circuit for combining said sinusoidal components to derive therefrom a resultant signal having a phase which is representative of said impedance variations of said element.

7. A system for deriving a signal having a phase representative of impedance variations comprising: a normally balanced impedance network including a variable impedance element and subject to being unbalanced by variations thereof; a first circuit for supplying a first periodic signal of predetermined repetition frequency to said network; said network having terminals at which is developed a signal representative of an unbalance of said network; a second circuit for supplying a second periodic signal of said predetermined repetition frequency and having a sinusoidal component in synchronism with and phase displaced from a sinusoidal component of said developed signal; and a circuit for coupling said network terminals and said second circuit in series relation for vectorially combining said sinusoidal components to derive therefrom a resultant signal having a phase which is representative of said impedance variations of said element.

8. A system for deriving a signal having a phase representative of force comprising: a member subject to deformation; a normally balanced impedance network including a variable impedance element attached to said member and having a dimension-responsive impedance variable with deformations of said member, said network being subject to being unbalanced by variations of the impedance of said element; a circuit for supplying a first periodic signal of predetermined repetition frequency to said network; said network having terminals at which is developed a signal representative of an unbalance of said network; a circuit for supplying a second periodic signal of said predetermined repetition frequency and having a sinusoidal component in synchronism with and phase displaced from a sinusoidal component of said developed signal; and a circuit for combining said sinusoidal components to derive therefrom a resultant signal having a phase which is representative of said impedance variations of said element and thus representative of the force causing said deformations of said member.

References Cited in the file of this patent

UNITED STATES PATENTS

| | | |
|---|---|---|
| 2,416,310 | Hansen | Feb. 25, 1947 |
| 2,496,148 | Butts | Jan. 31, 1950 |